Figure 1:
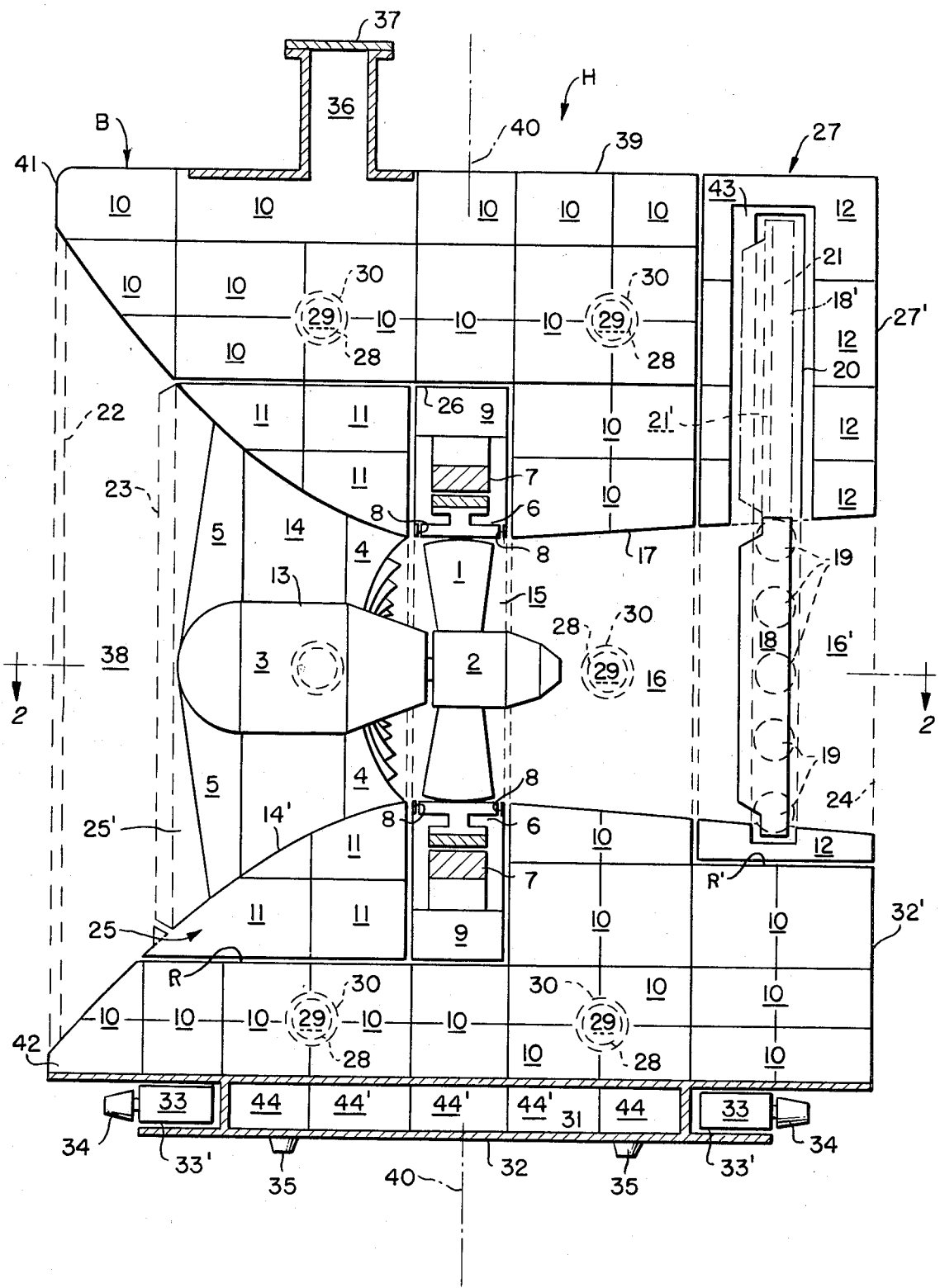

United States Patent [19]

Gutierrez Atencio

[11] 4,352,989
[45] Oct. 5, 1982

[54] HYDROMOTIVE SET

[76] Inventor: Francisco J. Gutierrez Atencio, Estafeta Dr. Garcia 3101, Diamante Entre Rios, Argentina

[21] Appl. No.: 180,167

[22] Filed: Aug. 19, 1980

[51] Int. Cl.$^3$ .............................................. E02B 9/00
[52] U.S. Cl. ........................................ 290/53; 405/78
[58] Field of Search ............... 290/54, 43, 52; 60/398; 415/4 A, 7, 129, 500, 140; 405/78; 417/234

[56] References Cited

U.S. PATENT DOCUMENTS

| 1,486,186 | 2/1924 | Harza ..................................... 290/52 |
| 4,159,188 | 6/1979 | Atencio ................................. 405/78 |

FOREIGN PATENT DOCUMENTS 537233  12/1955  Italy ...................................... 290/52

Primary Examiner—J. D. Miller
Assistant Examiner—D. L. Rebsch
Attorney, Agent, or Firm—Emory L. Groff, Jr.

[57] ABSTRACT

A hydromotive assembly for installation adjacent the water passage through a damming structure includes a main body component having an internal draft tube and provided with external guide and support elements allowing displacement of the assembly alternately in a vertical direction or angularly about a vertical axis. One sub-component body includes a water flow conduit containing a turbine generator set having a fixed-vane distributor and is insertable within the main body component in axial alignment with one end of the draft tube while another sub-component body includes a shiftable flow-controlling gate and is insertable adjacent another end of the draft tube. Water-tight chambers in the main body component as well as the sub-component bodies are selectively filled with air or fluid to controllably float, sink or tilt the assembly and allow the installation or removal of the sub-components from the main body component.

19 Claims, 2 Drawing Figures

HYDROMOTIVE SET

The present invention relates to an improved hydromotive assembly provided with a hydroelectric mechanism and which readily lends itself to mass-production in view of its greatly simplified construction.

These assemblies are intended to be located juxtaposed and in combination with the fluid flow conduits or other water passageways defined through the bodies of damming structures and the like, either for pure hydroelectric production, for pumped-storage systems, or at tidal coastal installations for power production from tides. In this latter instance, the present structure will be understood to be operable in both modes of the tidal cycles, that is, during both the ebb cycle (basin emptying cycle) and the flood cycle (basin filling cycle). The foregoing is achieved by means of hydromotive assemblies having fixed-blade runners of the propeller type, thereby avoiding the more costly hydromotive mechanisms utilizing Kaplan-type turbine runners having movable blades.

A further simplification is introduced by replacing the costly and cumbersome wicket-gate movable distributor with a fixed-vane distributor, forming a sub-component which is removably insertable within the assembly main body. Additionally, another removable sub-component is provided and includes a displaceable flow-controlling gate, employed during the starting and stopping of the hydroelectric mechanism and which also provides a continuation of a draft tube conduit formed within the main body of the hydromotive assembly.

This invention offers an improvement over U.S. Pat. No. 4,159,188 issued on June 26, 1979 which discloses a rotatable hydromotive assembly but lacks the removable subcomponents proposed herein.

It will be appreciated that by the use of fixed-bladed propellers on the generator or energy transformation sets, together with the use of fixed-vane distributors, a solid, rugged, compact structure is achieved permitting the use of greater diameter runners on the motive turbines with the result that more powerful machines may be realized for a given rate hydraulic head, than those feasible in a conventional assembly having Kaplan-type runners. Two notable advantages of such construction include the possibility of using runners having diameters of ten meters or more and also, a capability of handling fluid flows up to 70% greater than in Kaplan-type machines having same runner diameter. The result of the foregoing is that a better concentration of power potential is achieved as defined in terms of kw/linear meter of dam.

The functioning of the turbines of the present hydromotive assembly is readily transformed during variations in the associated water conditions in order to maximize energetic production when the turbine is operating in various modes. This transformation is enhanced by the inclusion of the draft tube conduit within the body of the displaceable hydromotive assembly and the self-contained flow controlling gate associated with the draft tube or diffuser. Manipulation of the gate allows start-up of the generator set, attainment of the set rated speed until synchronized with the electric network, the full loading of the set to the network, and stopping of the set by closure of the gate. All of the foregoing is accomplished by the single gate contained in the removable subcomponent of the hydromotive assembly and obviates the need for the costly, cumbersome wicket gate distributors of known devices.

The side walls of the hydromotive assembly define a constant radius such that an assembly is provided having a substantially cylindrical configuration when viewed in plan and which may be rotated about its center vertical axis to variably position the outlet open end of the assembly conduit. In a first position for example, the conduit outlet open end may be aligned with, and form a continuation of the fluid passageway of the dam main body. Alternately, upon rotation of the assembly 90°, the peripheral wall of the assembly body will fully close the open end of the dam fluid flow passageway, a relationship that may be employed as emergency means for closing the dam passageway, to allow maintenance within the dam structure, or to permit maintenance on the gate and/or its sub-component body.

Another dimension of this invention includes the ease by which the hydromotive assembly may be adapted for use not only for electric generation but also for use in a pumped-storage system. In this regards, the removable generator set sub-component in the main body of the assembly comprises a combination motor/generator and pump/turbine, selectively operable in either of the two desired modes and which may be generally regarded as an energy transformation set or unit.

The formation of the generator set as a portion of a separate, removable sub-component of the hydromotive assembly body is a highly desirable feature significantly reducing the amount and cost of material, labor and time necessary to fabricate and install this principal sub-component in a hydromotive assembly at a dam site.

The stayrings of horizontal-axis generating sets are often more than 15 meters in diameter and comprise the main support of the set. This enormous component must necessarily be split into several sections for transportation purposes, assembled later by bolting the radial flanges which requires several hundred bolts, and dozens of meters of gaskets used for sealing the stayring at the erection site of the hydrostation. Today, this approach is no longer suitable from either a technical or economic point of view particularly when considering the production of a large number of machines. This is because splitting the stayring into four or six parts demands thick radial flanges at the joints and the number of these flanges (8 or 12) gives rise to numerous obvious machining and assembly disadvantages.

The fixed-vane distributor proposed herein replaces the wicket gate or movable-vane distributor assembly so well known to those skilled in the art. Normally, in a tidal installation , the intricate, expensive wicket gate mechanism provides the sole actuating and safety device for the apparatus. With the present invention, a fixed-vane distributor is employed together with a flow-controlling gate located within a portion of a draft tube disposed within the unified hydromotive assembly. The result is not only a far more economical assembly but also a structure that readily lends itself to improved ease of repair, replacement, or interchangeability of components.

This latter feature is achieved by the formation of the gate mechanism, generator set and distributor/stayring assembly as separate sub-components individually insertable/removable from within axially aligned recesses formed in the main body component.

With the above arrangement, servicing or replacement of either one of the sub-components is accomplished by initially manipulating the entire hydromotive assembly to alter its conduit axis from the normal horizontal disposition to a vertical disposition with either end upwardly, depending upon which sub-component is to be serviced. This manipulation is preferably controlled by regulating the admission of air or water to the plurality of water-tight chambers formed in the main body component as well as in each of the sub-component bodies. Thus, with one end of the assembly tilted upwardly, the flow-controlling gate sub-component may be easily removed from the main body whereas with the opposite end upwardly, the stayring/fixed vane distributor and generator set are accessible for removal either together or individually.

Support and guide means such as rollers or sprockets are provided on the lateral and bottom periphery of the hydromotive assembly to facilitate its attachment to the adjacent installation structure and to permit controlled displacement of the assembly both vertically and angularly about its central vertical axis.

Accordingly, one of the objects of the present invention is to provide an improved hydromotive assembly comprising a unified structure including a displaceable main body having a flow gate and generator set each defined as a sub-component individually removable from the main body.

A further object of the present invention is to provide an improved hydromotive assembly comprising a unified structure having a main body and sub-bodies containing a generator set and flow gate with all of the bodies provided with flotation means permitting concurrent or independent displacement of the bodies.

Another object of the present invention is to provide an improved hydromotive assembly comprising a unified structure including a main body having a passage therethrough containing removable sub-bodies respectively defining a fluid intake having a generator set and a fluid draft tube having a controlling gate.

Figure 2:
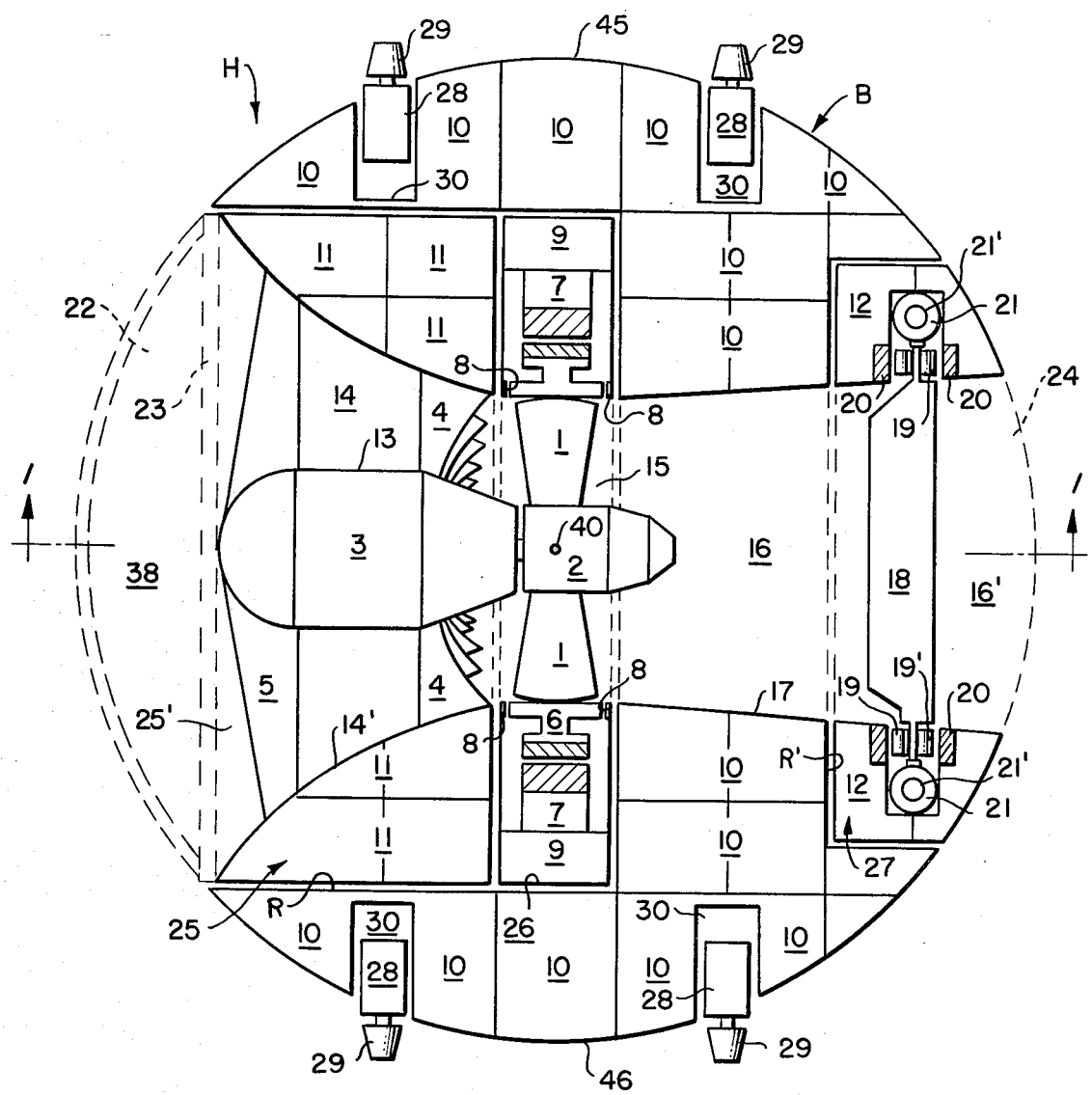

With these and other objects in view which will more readily appear as the nature of the invention is better understood, the invention consists in the novel construction, combination and arrangement of parts hereinafter more fully described, claimed and as illustrated in the accompanying drawings wherein:

FIG. 1 is a schematic vertical section view of a hydromotive assembly according to the present invention, taken along the line 1—1 of FIG. 2; and FIG. 2 is a schematic horizontal sectional view taken along line 2—2 of FIG. 1.

Similar reference characters designate corresponding parts throughout the several figures of the drawings.

Referring now to the drawing figures, the hydromotive assembly, generally designated H, is illustrated in combination with a generator-turbine set of the Harza type and is adapted to be supported along a horizontal axis centrally disposed within a conduit or a draft tube 14,16 serving as a water flow circulation path extending through the body of the assembly H. The turbine runner 1 is of the propeller type having fixed blades and is medially disposed with respect to the intake open end 22 and outlet open end 24 of the conduit 14,16. The axial hub 2 of this turbine runner 1 is joined and guided by well known shaft and bearing means extending into and located within the capsule body 3 situated upstreamly of the runner. The turbine runner and its attached capsule body are in turn supported in a cantilever manner in the central axial disposition as shown in the drawing figures by means of both the fixed vane distributor 4 joined to the downstream portion of the wall 13 of the water-tight capsule and by the stayring components 5 joined to the upstream portion of the capsule body wall 13. The outer periphery of the elements of the fixed vane distributor 4 and stayring 5 are attached to the wall 14' of the conduit portion 14 which wall 14' is an integral portion of a separate, sub-component body generally designated 25 and which is removably insertable within a recess R provided within the main body component B of the hydromotive assembly H.

The generator-turbine set above referred to includes a rotating generator rotor 6 carried by the outermost portions of the runner 1 in an area which is removed from the direct flow of water through the conduit 14,16 and which is juxtaposed the generator stator 7 normally fixedly disposed with respect to the adjacent machine hall chambers 9. The foregoing particularly describes a generator-turbine set but as mentioned earlier, the concept of the present invention is also adaptable for use in an installation having pump-storage capability and accordingly, that portion of the present apparatus which is henceforth referred to as the generator set may include a generator/motor-turbine/pump mechanism or in other words, an energy transformation unit.

In any case, an important feature of this invention is the provision of the above described sub-component body 25 as a separate structurally independent body which may easily be removed, substituted or reinstalled with respect to the main body component B without the necessity of disassembling, in situ, a plurality of intricate, bulky elements comprising the fixed distributor and stayrings as employed in hydromotive assemblies not having the benefits of this invention. The displacement of the sub-component body 25 is facilitated by means of the plurality of water-tight chambers 11 contained within this body and which may be filled or emptied respectively with air or water in order to regulate the buoyancy of the entire sub-component body 25 and thereby control the flotation of this body to achieve its removal or insertion within the recess R of the hydromotive assembly main body component B.

As will become more apparent hereinafter, the above displacement of the sub-component body 25 is usually attended by a prior displacement of the entire assembly H by means of similar hermetic chambers 10 provided therein and which are filled and emptied with air or water to facilitate tilting and/or flotation of the entire assembly H so as to position the first intake open end 22 of the conduit 14 in an uppermost position whereafter it will follow that upon providing buoyancy of the sub-component body 25, the latter may be easily removed in a straight, vertical direction with or without the assistance of a cable and hoist. The entire group of the above described elements associated with the generator set may be concurrently displaced as a single sub-component body or alternatively, the capsule body 3 and its attached fixed vane distributor body 4 and stayring 5 may be removed from the balance of the assembly H while the runner 1 and attached rotor 6 and cooperating stator 7 remain within the recess R. This latter situation would be applicable if the required repair or substitution only involves the removed components in which case it would not be necessary to remove the runner 1. In this respect, the turbine runner 1 and the radially disposed structure may be considered to comprise portions of an additional sub-component and will include the rotatable venturi conduit 15 having its lateral portions appropriately sealed as at 8 with respect to the adjacent portions of the conduit 14 and draft tube 17. The diameter of the rotatable venturi conduit 15 will be seen to provide a cross-sectional area which is noticeable smaller than that as defined by the conduit wall 14' the latter of which produces a constantly enlarged cross-sectional area from its portion adjacent the rotatable venturi conduit 15 toward the first intake open end 22. This additional sub-component will be seen to be bounded by the wall or body 26 surrounding the machine hall chamber 9.

Appropriate trashrack structure 23 may be carried by the upstream-most portion of the sub-component body 25 adjacent the first open end 25' of the body 25.

The draft or diffuser tube 16 is defined by a diffuser conduit wall 17 in the main body portion B which will be seen to extend axially from the downstream portion of the venturi conduit 15 and joins, in a smooth flowing manner, with a separate draft tube downstream portion 16' which will be understood to comprise a portion of a further sub-component body 27. In addition to providing a portion of the draft tube forming the downstream-most segment of the fluid flow passage through the hydromotive assembly, this sub-component 27 includes a flow-controlling gate capable of being shifted from the full line position 18 shown in FIG. 1 of the drawings to an out of the way position reflected by the broken lines 18' in FIG. 1 in which latter position, the entire gate structure is removed from any restrictive placement within the water flow path through the hydromotive assembly H.

The foregoing displacement of the gate 18 between its alternate positions is facilitated by means of a plurality of rollers 19 carried by its lateral edges and bearing upon guide means 20 recessed within the body 27. Rectilinear displacement of the flow controlling gate 18, to and from its retracted position 18', may be conveniently accomplished by means of the hydraulic cylinders 21—21 located at opposite sides thereof and including respective hydraulic rods 21'—21'.

In this manner, instantaneous control over the volume of fluid passing through the assembly is achieved so as to allow regulation of the energy transformation unit during start-up, synchronization, or shut-down. From the two drawing figures, it will be seen that as in the case of the first two described sub-components, the body or housing of this third sub-component 27 completely encircles the fluid flow passageway portion defined by the draft tube extension 16', with this encircling body including a plurality of water-tight chambers 12. These chambers 12 are regulated in the same manner as the previously described water-tight chambers 10 and 11 so as to allow for the admission of air or water respectively, to regulate the buoyancy of the entire gate sub-component body 27 so that this body may be readily removed, substituted or reinstalled within the recess R' formed in the main body component B. This displacement of the subcomponent body 27 is usually preceded by an appropriate displacement of the entire hydromotive assembly H so as to position the downstream face of the assembly away from the main body of the cooperating dam and, as in the case of the removal of the other described sub-components, the main body component B may be tilted so that the downstream portion thereof is facing upwardly prior to removal of the gate controlling sub-component body 27.

From the drawing figures, it will be seen that the hydromotive assembly H defines a symmetrical arrangement with the central vertical axis 40 passing through the center of the runner 1 while the peripheral lateral faces 45,46 define a cylindrical configuration. This arrangement greatly facilitates the displacement of the entire assembly H either for servicing thereof, removal or replacement of any one of its sub-component bodies, or alterations of the operating mode of the dam installation. With the intake 38 of the water flow circulation path through the assembly disposed upstream and the downstream outlet open end 24 mating with the fluid passageway through a dam main body (not shown) it will be understood that the energy transformation unit or generator set may be started, regulated and stopped by manipulation of the rectilinear displacement of the flow controlling gate 18 which manipulation of course, would vary the amount and rate of water flow through the conduit 14,16,16'. The ability to service or replace the flow controlling gate 18 in view of its incorporation as an integral portion of the removable sub-component body 27, should be an obvious advantage to those skilled in the art since this sub-component forms a part of the overall assembly H which is also readily displaceable with respect to a dam main body. By the cylindrical configuration of the entire assembly H, an emergency feature is available whereby should a failure occur in the actuating mechanism for the gate 18, an emergency shut-down of the dam's conduit may be achieved by rotating the assembly H about its central vertical axis 40 for an amount about 90° thus presenting the imperforate surface of the peripheral portions 45 or 46 juxtaposed the water passageway through the dam main body, while both sea-side and basin-side levels are nearly equalized.

The foregoing arcuate displacement of the assembly H may be accomplished by any appropriate means serving to normally support the assembly juxtaposed a dam body with the horizontal axis of the water flow conduit aligned with the water flow passageway through the dam body. As shown in FIG. 1 of the drawings, a lower wall 32 is disposed beneath the double bottom wall 31 of the main component body B and includes a plurality of depending pins or elements 35 normally supporting the entire assembly upon an appropriate upstream slab associated with the dam body. Ballast means 44 located adjacent the lower wall 32 insure positive positioning of the assembly with respect to the related dam structure and may be located adjacent bottom dredging chambers 44' beneath the normally installed assembly H. Recesses 33 are provided about the periphery of the lower portion of the assembly body and include roller motors 33' each having a radially extending roller body 34 adapted to engage a suitable support member such as a track (not shown) provided to guide the rotary displacement of the assembly H when the motors 33' are activated to pivot the assembly about its center line 40.

Vertical displacement of the entire hydromotive assembly H may be accomplished by the provision of appropriate motive/guide means adjacent the periphery 45,46 of the assembly such as the motors 28 situated within the recesses 30 and which are actuated to drive the rollers 29. The rollers 29 may, in fact, be any appropriate means facilitating vertical displacement of the assembly H such as pinions adapted to engage vertically disposed racks (not shown) and will be understood to be retractable from the extended position shown in FIG. 2 in order to allow the previously described rotary displacement of the assembly. During this rotation of the assembly, not only is the fluid flow conduit removed from an axial alignment with the dam fluid flow passageway but as the downstream upper and lower wall portions 27' and 32' of the assembly are removed from juxtaposition the dam body, it will be appreciated that the gate sub-component 27 is readily accessible for servicing or removal. At the same time, the upstream upper and lower wall portions 41 and 42 are likewise still clear of any structure of the dam main body and accordingly, the sub-component body 25 and machine hall sub-component 26 may be removed.

Service access to the main body component B is provided by the access 36 which includes a removable cover 37 as shown in FIG. 1.

In operating the hydromotive assembly H with the gate being in the fully open position 18', the generator set produces full power and when the gate is in the lowered, closed position the generator set is idle. Thus, with the gate partly closed, the generator set acts in a relief operation mode at higher heads or simply runs idle without power production, but synchronized to the network. Accordingly, upon actuation of gate 18, fluid enters the first open end 22 through the intake 38 and is guided initially by the stayring vanes 5 into the annular conduit 14 defined between the capsule wall 13 and wall 14' until the fully guided hydrodynamic performance is realized by means of the fixed vanes 4 of the distributor and then the fluid flow is directed through the venturi conduit 15 and causes actuation of the blades 1 attached to the turbine hub 2 thereby actuating the electric generator 6,7 associated with the turbine runner 1. The outgoing fluid flow is displaced through the draft-tube conduit 16, or energetic dynamic recoverer conduit, until it exhausts through the outlet second open end 24.

The above is accomplished, either during the ebb tidal cycle, or the flood tidal cycle, in tidal installations if a suitable head is available. In a river hydro installation, the generation is realized with the outlet open end 24 juxtaposed the dam's open end conduit. By reversing the energy transformation unit it is possible to realize energy accumulation, if the upstream open end 22 is juxtaposed the dam's conduit open end.

I claim:

1. A hydromotive assembly for placement adjacent the fluid flow passageway of a dam main body, said assembly including a normally horizontally disposed fluid flow conduit having opposite first and second open ends at extreme opposite faces of said assembly, an energy transformation unit having at least one rotatable element disposed within said conduit, means within said conduit guiding the circulation path of fluid passing through said conduit, means in said conduit displaceable to control the volume of fluid flow through said conduit, said assembly including a main body component, said guiding means and displaceable means comprising separate, independent removable sub-component bodies insertable within said main body component, said two assembly opposite faces and conduit opposite open ends configured to allow alternative positioning of either said conduit open end in coincidence with said dam fluid flow passageway, buoyancy means in said assembly operable to vary the flotation and sinking of the assembly to permit its displacement for removal, exchange, repair or the like, and said buoyancy means operable to rotate said assembly 90° from said normal horizontal position to dispose said conduit vertically and expose either said assembly opposite face upwardly whereby said sub-components are disposed for vertical removal from said main body component.

2. A hydromotive assembly according to claim 1 wherein said assembly includes support and guide means adjacent its bottom surface allowing rotary displacement of said assembly about its central vertical axis whereby said conduit first and second open ends may be alternately juxtaposed said dam fluid flow passageway.

3. A hydromotive assembly according to claim 1 wherein said assembly includes a substantially cylindrical peripheral wall rotatable about a central vertical axis whereby said assembly is angularly displaceable to shift said second conduit open end from juxtaposition with said dam fluid flow passageway to seal off said passageway with said peripheral wall.

4. A hydromotive assembly according to claim 1 wherein said buoyancy means includes a plurality of water-tight chambers selectively filled with gas or liquid to alternately allow vertical or angular displacement of said assembly.

5. A hydromotive assembly according to claim 2 wherein said support and guide means includes motor driven rollers.

6. A hydromotive assembly according to claim 1 including dredging means carried by the bottom of said assembly.

7. A hydromotive assembly according to claim 4 wherein said assembly includes a peripheral face, and guide means on said peripheral face extendable during said vertical displacement and retractible during said angular displacement.

8. A hydromotive assembly according to claim 1 wherein said displaceable means sub-component body includes a gate.

9. A hydromotive assembly for placement adjacent the fluid flow passageway of a dam main body, said assembly including a normally horizontally disposed fluid flow conduit having opposite first and second open ends at extreme opposite faces of said assembly, an energy transformation unit having at least one rotatable element disposed within said conduit, means within said conduit guiding the circulation path of fluid passing through said conduit, means in said conduit displaceable to control the volume of fluid flow through said conduit, said assembly including a main body component, said guiding means and displaceable means comprising separate, independent removable sub-component bodies insertable within said main body component, said two assembly opposite faces and conduit opposite open ends configured to allow alternative positioning of either said conduit open end in coincidence with said dam fluid flow passageway, said main body component including a recess adjacent each said assembly opposite faces, said recesses axially aligned with said conduit and removably receiving said sub-component bodies and buoyancy means in said assembly operable to vary the flotation and sinking of the assembly to permit its displacement for removal, exchange, repair of the like.

10. A hydromotive assembly for placement adjacent the fluid flow passageway of a dam main body, said assembly including a normally horizontally disposed fluid flow conduit having opposite first and second open ends at extreme opposite faces of said assembly, an energy transformation unit having at least one rotatable element disposed within said conduit, means within said conduit guiding the circulation path of fluid passing through said conduit, means in said conduit displaceable to control the volume of fluid flow through said conduit, said assembly including a main body component, said guiding means and displaceable means comprising separate, independent removable sub-component bodies insertable within said main body component, said two assembly opposite faces and conduit opposite open ends configured to allow alternative positioning of either said conduit open end in coincidence with said dam fluid flow passageway, said energy transformation unit including an additional sub-component body medially disposed within said conduit, said guiding means sub-component body disposed intermediate said rotatable element and said first conduit open end, buoyancy means in said assembly operable to vary the flotation and sinking of the assembly to permit its displacement for removal, exchange, repair or the like.

11. A hydromotive assembly for placement adjacent the fluid flow passageway of a dam main body, said assembly including a normally horizontally disposed fluid flow conduit having opposite first and second open ends at extreme opposite faces of said assembly, an energy transformation unit having at least one rotatable element disposed within said conduit, means within said conduit guiding the circulation path of fluid passing through said conduit, means in said conduit displaceable to control the volume of fluid flow through said conduit, said assembly including a main body component, said guiding means and displaceable means comprising separate, independent removable sub-component bodies insertable within said main body component, said two assembly opposite faces and conduit opposite open ends configured to allow alternative positioning of either said conduit open end in coincidence with said dam fluid flow passageway, said fluid guiding means sub-component body including a stayring and distributor contained in a sub-component body disposed adjacent said first conduit open end and buoyancy means in said assembly operable to vary the flotation and sinking of the assembly to permit its displacement for removal, exchange, repair or the like.

12. A hydromotive assembly for placement adjacent the fluid flow passageway of a dam main body, said assembly including a normally horizontally disposed fluid flow conduit having opposite first and second open ends at extreme opposite faces of said assembly, an energy transformation unit having at least one rotatable element disposed within said conduit, means within said conduit guiding the circulation path of fluid passing through said conduit, means in said conduit displaceable to control the volume of fluid flow through said conduit, said assembly including a main body component, said guiding means and displaceable means comprising separate, independent removable sub-component bodies insertable within said main body component, said two assembly opposite faces and conduit opposite open ends configured to allow alternative positioning of either said conduit open end in coincidence with said dam fluid flow passageway, said sub-component bodies include bodies containing said energy transformation unit and said fluid guiding means and body insertable within said main body component from said first conduit open end and buoyancy means in said assembly operable to vary the flotation and sinking of the assembly to permit its displacement for removal, exchange, repair or the like.

13. A hydromotive assembly for placement adjacent the fluid flow passageway of a dam main body, said assembly including a normally horizontally disposed fluid flow conduit having opposite first and second open ends at extreme opposite faces of said assembly, an energy transformation unit having at least one rotatable element disposed within said conduit, means within said conduit guiding the circulation path of fluid passing through said conduit, means in said conduit displaceable to control the volume of fluid flow through said conduit, said assembly including a main body component, said guiding means and displaceable means comprising separate, independent removable sub-component bodies insertable within said main body component, said two assembly opposite faces and conduit opposite open ends configured to allow alternative positioning of either said conduit open end in coincidence with said dam fluid flow passageway, buoyancy means in said assembly operable to vary the flotation and sinking of the assembly to permit its displacement for removal, exchange, repair or the like, and said buoyancy means including a plurality of water-tight chambers in said main body component selectively filled with gas or liquid to rotate said assembly 90° from said normal horizontal position to dispose said conduit vertically and expose either said assembly opposite face upwardly.

14. A hydromotive assembly for placement adjacent the fluid flow passageway of a dam main body, said assembly including a normally horizontally disposed fluid flow conduit having opposite first and second open ends at extreme opposite faces of said assembly, an energy transformation unit having at least one rotatable element disposed within said conduit, means within said conduit guiding the circulation path of fluid passing through said conduit, means in said conduit displaceable to control the volume of fluid flow through said conduit, said assembly including a main body component, said guiding means and displaceable means comprising separate, independent removable sub-component bodies insertable within said main body component, said two assembly opposite faces and conduit opposite open ends configured to allow alternative positioning of either said conduit open end in coincidence with said dam fluid flow passageway, buoyancy means in said assembly operable to vary the flotation and sinking of the assembly to permit its displacement for removal, exchange, repair or the like, and said buoyancy means including a plurality of water-tight chambers in said main body component and said sub-component bodies selectively filled with gas or liquid to rotate said assembly 90° from said normal horizontal position to dispose said conduit vertically and expose either said assembly opposite face upwardly.

15. A hydromotive assembly according to claim 1 wherein said first and second conduit open ends define respectfully upstream and downstream portions of said conduit, said downstream conduit portion comprising a draft tube, said displaceable flow control sub-component body disposed downstream of said rotatable element, and said fluid circulation path guiding sub-component body disposed upstream of said rotatable element.

16. A hydromotive assembly according to claim 15 wherein said fluid circulation path guiding sub-component body includes a fixed stayring and said displaceable flow control sub-component body comprises a gate having motive means for displacing said gate.

17. A hydromotive assembly according to claim 15 wherein said fluid circulation path guiding sub-component body includes a fixed vane distributor and said displaceable flow control sub-component body comprises a gate having motive means for displacing said gate.

18. A hydromotive assembly according to claim 17 wherein said energy transformation unit comprises a hydroelectric set of the Harza type having generator elements surrounding said rotatable element and disposed externally of said conduit.

19. A hydromotive assembly according to claim 1 wherein said buoyancy means includes a plurality of water-tight chambers in said main body component and said sub-component bodies.

* * * * *